United States Patent [19]

Chattha

[11] 4,323,660

[45] Apr. 6, 1982

[54] COMPOSITION WITH LATENT REACTIVE CATALYST - #5

[75] Inventor: Mohinder S. Chattha, Livonia, Mich.

[73] Assignee: Ford Motor Company, Dearborn, Mich.

[21] Appl. No.: 109,437

[22] Filed: Jan. 4, 1980

[51] Int. Cl.$^3$ .................... C08L 37/00; C08L 61/28
[52] U.S. Cl. .................... 525/161; 525/110; 525/158; 525/162; 525/438; 525/511; 525/513; 525/353; 528/90; 528/109
[58] Field of Search .............. 525/161, 162, 110, 158, 525/511, 513, 438; 528/90, 109

[56] References Cited

U.S. PATENT DOCUMENTS

| | | | |
|---|---|---|---|
| 2,227,708 | 1/1941 | Cordier | 260/71 |
| 2,681,897 | 6/1954 | Frazier | 260/45.2 |
| 2,853,463 | 9/1958 | Gaylord | 260/45.2 |
| 3,082,184 | 3/1963 | Falgiatore | 260/30.4 |
| 3,235,622 | 2/1966 | Clemens | 260/856 |
| 3,269,994 | 8/1966 | Horn | 260/86.1 |
| 3,330,814 | 7/1967 | Vasta | 525/162 |
| 3,414,635 | 12/1968 | Edwards | 260/851 |
| 3,865,683 | 2/1975 | Schnee | 161/205 |
| 3,960,979 | 6/1976 | Khanna | 525/110 |
| 4,027,066 | 5/1977 | Victorius | 525/161 |
| 4,083,830 | 4/1978 | Gallacher | 260/67.6 |
| 4,083,892 | 4/1978 | Sekmakas | 260/855 |
| 4,137,389 | 1/1979 | Wingler | 526/86 |
| 4,181,784 | 1/1980 | Chattha et al. | 525/161 |
| 4,181,785 | 1/1980 | Chattha et al. | 525/161 |

FOREIGN PATENT DOCUMENTS

| | | |
|---|---|---|
| 2356768 | 1/1975 | Fed. Rep. of Germany . |
| 2345114 | 3/1975 | Fed. Rep. of Germany . |
| 2812397 | 3/1979 | Fed. Rep. of Germany ...... 525/162 |

*Primary Examiner*—Paul Lieberman
*Attorney, Agent, or Firm*—Roger L. May; K. L. Zerschling

[57] ABSTRACT

Thermosetting compositions comprising: (A) a sulfonic acid ester comprising the reaction product of an epoxy functional polymer bearing hydroxyl functionality, and a sulfonic acid having the formula

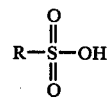

wherein R is selected from linear or branched alkyl groups and aryl groups; and (B) an amine aldehyde crosslinking agent.

During cure of the composition, component (A) breaks down to form not only a reactive sulfonic acid catalyst, but also the hydroxy functional film forming material which crosslinks with the amine aldehyde crosslinking agent.

10 Claims, No Drawings

COMPOSITION WITH LATENT REACTIVE CATALYST - #5

BACKGROUND OF THE INVENTION

This invention relates to compositions of the type comprising a film-forming component and an amino compound, wherein the composition cures by reaction between the amino compound and hydroxyl functionality present on the film forming material. More particularly, the invention relates to thermosetting compositions of the aforementioned type wherein the composition includes a latent reactive catalyst for the hydroxyl-/amino curing reaction. Still more particularly, the invention relates to thermosetting compositions of the aforementioned type wherein the film forming component bearing hydroxyl functionality is generated by the heat induced breakdown of the latent reactive catalyst.

Thermosetting compositions which cure by reaction of hydroxyl functionality with an amino compound are well known in the art. It is also well recognized in the art that it is desirable to catalyze the hydroxyl/amino crosslinking reaction in order to obtain a quicker and more complete cure of the composition, particularly when the composition is to be used as a coating material. To this end, catalysts for this reaction have developed and are also well known. Exemplary of the numerous known catalysts are p- toluene sulfonic acid and various organophosphate esters such as those taught by U.S. Pat. Nos. 3,960,979 and 4,018,848 to Khanna. In many compositions these catalysts also function as reactive catalysts.

While these known catalysts and reactive catalysts effectively catalyze the hydroxyl/amino reaction, they have several deficiencies. When necessary amounts of prior art catalysts are included in compositions curing via the hydroxyl/amino reaction, the compositions often lack shelf stability resulting in premature crosslinking. Many prior art catalysts have a detrimental effect on pigments, thus resulting in color changes, in some of the known catalysts cause coagulation of the compositions. Still further, some of the known catalysts result in gassing when used in compositions including metallic pigments.

The compositions of this invention employ a latent reactive catalyst which generates the catalyst in situ and, thus, do not suffer from the aforementioned deficiencies. Because the catalyst is generated in situ during cure, sufficient amounts of latent reactive catalyst may be included in the composition in order to allow for rapid cure, without causing deleterious effects, including loss of shelf life.

The compositions of the invention have particular utility as fast curing, high solids, thermosetting coating compositions. More particularly, the compositions are adapted to provide an automotive topcoat demonstrating hardness, high gloss, outstanding durability and excellent resistance to solvents and water. The compositions are particularly suitable as high solids thermosetting coating compositions adapted to be used as automotive topcoats including metallic flake as a pigment.

Because of increasingly strict solvent emission regulations in recent years, low solvent emission paints have become very desirable. A number of high solids compositions have been proposed to meet these low solvent emission requirements. However, many of these compositions are deficient because of difficulty in application, slow curing rates, lack of flexibility, poor durability and low solvent and water resistance. Many of the proposed compositions have been particularly deficient as automotive topcoats, particularly when the topcoat is to include metallic flake as pigment.

The deficiency in compositions including metallic flake results from excessive gassing as well as undesired reorientation of metallic flake during application and cure of the coating. Flake reorientation results primarily because of the very low viscosity resins used in the paint compositions to accommodate high solids. The low viscosity is not sufficient to immobilize the flakes which tend to redistribute themselves to show "reverse flop' and nonuniform distribution.

The compositions of this invention combine the above desired properties and low application viscosity with rapid cure so as to overcome deficiencies of previously proposed high solids materials and thereby achieve a high solids coating composition particularly adapted for automotive topcoates including metallic flake as pigment.

SUMMARY OF THE INVENTION

The thermosetting compositions of the invention, exclusive of pigments, solvents and other nonreactive components, consist essentially of:

(A) a sulfonic acid ester comprising the reaction product of
  (i) an epoxy functional polymer bearing at least 2 hydroxyl groups per molecule, and
  (ii) a sulfonic acid having the formula

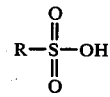

wherein R is selected from linear or branched alkyl groups and aryl groups, the epoxy functional polymer and sulfonic acid being reacted in such amounts that there are between about 0.3 and about 1 acid groups per epoxy group in the reaction mixture; and (B) an amine aldehyde crosslinking agent in an amount ranging from about 15 to about 45 weight percent based on the total weight of (A) and (B).

The sulfonic acid ester not only serves as a latent reactive catalyst which generates the sulfonic acid catalyst of the composition, but also as a precurser of the hydroxy functional film forming material which is also generated in situ. This hydroxy functional polymeric material resulting from the breakdown of the sulfonic acid catalyst is the sole film forming material of the compositions of the invention. Thus, as the composition is heated during the curing cycle, the sulfonic acid ester breaks down to form the sulfonic acid catalyst and the hydroxy functional polymeric component which may or may not bear epoxy functionality which has not been previously reacted in the preparation of the sulfonic acid ester. At those reaction sites where the sulfonic acid moieties become disconnected from the polymer as the composition is heated, ketones, aldehydes or other organic groups may be formed.

The sulfonic acid catalyst generated from the sulfonic acid ester not only catalyzes the hydroxyl/amino reaction but also may react with epoxy functionality on the hydroxy functional polymeric material which is simultaneously generated in situ. This hydroxyl functionality is then available to participate in the catalyzed hydroxyl/amino crosslinking reaction.

Other ingredients which may be included in the compositions of the invention are additives such as catalysts, antioxidants, U.V. absorbers, flow control or wetting agents, antistatic agents, pigments, plasticizers, solvents, etc.

RELATED APPLICATIONS

Other applications covering compositions comprising latent reactive sulfonic acid catalysts, which are commonly assigned with this application, are U.S. Ser. Nos. 109,591, 109,599, 109,438 and 109,448 bearing the titles "Composition With Latent Reactive Catalyst -#1, -#2, -#3 and -#4" respectively, all filed concurrently with this application.

PRIOR ART

U.S. Pat. No. 2,227,708 to Cordier teaches urea formaldehyde thermosetting molding compositions containing a latent accelerator (column 1, lines 26–50). The latent accelerator of Cordier is selected from the group consisting of an organic acid having the formula:

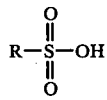

esterified with various alcohols including

Y—CH$_2$—OH wherein X is phenyl or alkyl phenyl, such as CH$_3$—CH$_6$H$_4$ (o- or p- tolyl), and Y is alkyl, hydroxy alkyl, alkoxy alkyl or aroxy alkyl (column 2, 1.54—column 3, 1.25).

U.S. Pat. No. 4,083,830 discloses catalysis of melamine formaldehyde thermosetting resin systems with polyalkylaromatic sulfonic acids (Abstract; column 2, 11.12–25).

U.S. Pat. No. 4,083,892 discloses high solids coating compositions comprising hydroxy functional copolymers and aminoplast resins (Abstract; column 1, 11. 28–50; column 2, 11. 38–47).

U.S. Pat. No. 4,137,389 discloses high solids binder compositions comprising hydroxy functional acrylic resins (Column 3, 11. 16–49) and aminoplast crosslinking agents (column 8, 11. 20–22).

U.S. Pat. Nos. 2,681,897, 2,53,463, 3,02,184, 3,235,622, 3,269,994, 3,414,635 and 3,865,683 teach compositions comprising hydroxy functional materials and aminoplastic crosslinking agents. Catalysts employed, if any, are conventional types.

DETAILED DESCRIPTION OF THE INVENTION

As discussed generally above, the compositions of the invention are thermosetting materials which, exclusive of pigments, solvents and other nonreactive components, consist essentially of:

(A) a sulfonic acid ester comprising a particular reaction product of an epoxy functional polymer bearing hydroxyl functionality and a particular sulfonic acid; and (B) an amine aldehyde crosslinking agent.

Sulfonic Acid Ester

The sulfonic acid ester component of the compositions of the invention comprises the reaction product of (i) an epoxy functional polymer bearing at least 2 hydroxyl groups, preferably between about 4 and about 6 hydroxyl groups per molecule and (ii) a sulfonic acid having the formula

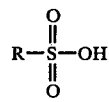

wherein R is selected from linear or branched alkyl groups and aryl groups. The epoxy functional polymer and the sulfonic acid are reacted in such amounts that there are between about 0.3 and about 1 acid groups, preferably between about 0.6 and about 0.9 acid groups, per epoxy in the reaction mixture.

The epoxy functional polymer used in the preparation of the sulfonic acid ester is preferably either a bifunctional copolymer bearing both hydroxyl functionality and pendent epoxy functionality or a polyepoxide resin bearing between about 2 and about 4 hydroxyl groups and between 2 and about 3 epoxy groups per molecule.

The preferred bifunctional copolymer bearing hydroxyl functionality and epoxy functionality has a number average molecular weight of ($M_n$) of between about 1500 and about 10,000 and the glass transition temperature (Tg) of between about −25° C. and about 70° C. The bifunctional copolymer is prepared in accordance with conventional techniques, e.g., free radical polymerization, from (a) between about 0.5 and about 30 weight percent of monoethylenically unsaturated monomers bearing glycidyl functionality, (b) between about 10 and about 30 weight percent of monoethylenically unsaturated monomers bearing hydroxyl functionality, and (c) between about 65 and about 89.5 weight percent of other monoethylenically unsaturated monomers.

The monoethylenically unsaturated monomers bearing glycidyl functionality may be either glycidyl ethers or glycidyl esters. Preferably, however, the epoxy functional monomers are glycidyl esters of monoethylenically unsaturated carboxylic acids. Examples are glycidyl acrylates and glycidyl methacrylates.

Preferably, the hydroxyl functionality on the bifunctional copolymer is pendent hydroxyl functionality provided by monoethylenically unsaturated monomers.

The long list of hydroxy functional monomers which may be employed in preparing these bifunctional copolymers includes, but is not limited to, the following esters of acrylic or methacrylic acid and aliphatic alcohols: 2-hydroxyethyl acrylate; 3-chloro-2-hydroxypropyl acrylate; 2-hydroxy-1-methylethyl acrylate; 2-hydroxypropyl acrylate; 3-hydroxypropyl acrylate; 2,3-dihydroxypropyl acrylate; 2-hydroxybutyl acrylate; 4-hydroxybutyl acrylate; diethyleneglycol acrylate; 5-hydroxypentyl acrylate; 6-hydroxyhexyl acrylate; triethyleneglycol acrylate; 7-hydroxyheptyl acrylate; 2-hydroxymethyl methacrylate; 3-chloro-2-hydroxypropyl methacrylate; 2-hydroxy-1-methylethyl methacrylate; 2-hydroxypropyl methacrylate; 3-hydroxypropyl methacry-2,3-dihydroxypropyl methacrylate; 2-hydroxybutyl methacrylate; 4-hydroxybutyl methacrylate; 3,4-dihydroxybutyl methacrylate; 5-hydroxypentyl methacrylate; 6-hydroxyhexy methacrylate; 1,3-dimethyl-3-hydroxybutyl-ethacrylate; 5,6-dihydroxyhexyl methacrylate; and 7-hydroxyheptyl methacrylate.

Although one of ordinary skill in the art will recognize the many different hydroxyl bearing monomers including those listed above could be employed, the preferred hydroxy functional monomers for use in the bifunctional copolymers employed in preparing the sulfonic acid ester are $C_5$–$C_7$ hydroxy alkyl acrylates and/or $C_6$–$C_8$ hydroxy alkyl methacrylates, i.e., esters of $C_2$–$C_3$ dihydric alcohols and acrylic or methacrylic acids.

As noted above, the remainder of the monomers forming the bifunctional copolymer used in the preparation of the latent reactive catalyst, i.e., between about 65 and about 89.5 weight percent, are other monoethylenically unsaturated monomers. These monoethylenically unsaturated monomers are preferably alpha, beta olefinically unsaturated monomers, i.e., monomers bearing olefinic unsaturation between the two carbon atoms in the alpha and beta positions with respect to the terminus of an aliphatic carbon to carbon chain.

Among the alpha, beta olefinically unsaturated monomers which may be employed in such copolymers are acrylates (meaning esters or either acrylic or methacrylic acids) as well as mixtures of acrylates and vinyl hydrocarbons. Preferably, in excess of 50 weight percent of the total of the copolymer monomers are esters of $C_1$–$C_{12}$ monohydric alcohols and acrylic or methacrylic acids, e.g., methylmethacrylate, ethylacrylate, butylacrylate, butylmethacrylate, hexylacrylate, 2-ethylhexylacrylate, laurylmethacrylate, etc. Among the monovinyl hydrocarbons suitable for use in forming the copolymers are those containing 8 to 12 carbon atoms and including styrene, alpha methylstyrene, vinyl toluene, t-butylstyrene and chlorostyrene. When such monovinyl hydrocarbons are employed, they should constitute less than 50 weight percent of the copolymer. Other monomers such as vinyl chloride, acrylonitrile, methacrylonitrile, and vinyl acetate may be included in the copolymer as modifying monomers. However, when employed, these modifying monomers should constitute only between about 0 and about 30 weight percent of the monomers in the copolymer.

The preferred polyepoxide resins employed in the preparation of the sulfonic acid ester of the compositions has at least two epoxide groups thereon per molecule, preferably between about two and about 3 epoxide groups per molecule.

Useful polyepoxides may be selected from aliphatic, cycloaliphatic and aromatic polyepoxides falling within the aforementioned molecular weight range. Such polyepoxides are well known compositions and any of these may be employed in the preparation of the sulfonic acid esters useful in compositions of the invention. Among the suitable types of polyepoxides are those disclosed by U.S. Pat. Nos. 3,404,018; 2,528,359; 2,528,360; 3,198,850; 3,960,979; and 4,018,848.

U.S. Pat. No. 3,404,018 discloses several particularly suitable types of polyepoxides including: (1) polyglycidyl ethers of polyhydric alcohols and polyhydric phenols: (2) epoxidized esters of polyethylenically unsaturated monocarboxylic acids; (3) glycidyl esters of polybasic acids; (4) epoxidized esters of unsaturated monohydric alcohols and polycarboxyl acids; and (5) epoxidized polymers and copolymers of diolefins. Many polyepoxides other than those recited in this or other referenced patent will be apparent to those skilled in the art.

Polyepoxides of the above enumerated type, should additionally bear hydroxyl functionality within the aforementioned range per molecule.

As noted above, the sulfonic acid reactant employed in the preparation of the sulfonic acid ester has the formula

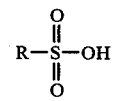

wherein R is selected from linear or branched alkyl groups and aryl groups. Exemplary of the numerous alkyl groups which may be employed as the R group in the sulfonic acid are: methyl, ethyl, propyl, butyl, isobutyl, pentyl, hexyl, etc. Exemplary of the numerous aryl groups which may be employed as R are phenyl, o- and p- methoxy phenyl, o- and p- ethoxy phenyl, and o- and p- tolyl groups, etc. Ortho and para tolyl groups are preferred.

In the course of the curing of compositions of the invention, the sulfonic acid ester breaks down to form not only the sulfonic acid catalyst, but also the hydroxy functional polymeric component which crosslinks with the amino component of the composition. The sulfonic acid catalyst, of course, catalyzes this hydroxy/amino crosslinking reaction.

The hydroxy functional polymeric component is the residue of the epoxy functional polymer which was reacted with the sulfonic acid to form the sulfonic acid ester. As noted above, it bears hydroxyl functionality which crosslinks to cure the compositon. If an excess of epoxide functionality is present in the original reaction mixture used to form the sulfonic acid catalyst such that epoxide functionality on the polymeric component remains unreacted, epoxide will be present on the polymeric residue after breakdown of the sulfonic acid ester. This epoxide remaining on the polymeric residue is then available to react with the acid groups of the generated sulfonic acid catalyst to form further hydroxyl groups. These hydroxyl groups, in addition to the hydroxyl groups present on the polymeric component initially, will in turn be available to crosslink with the amino crosslinking agent during cure.

As noted hereinbefore, at those reaction sites where sulfonic acid moieties become disconnected from the polymer as the composition is heated, ketones, aldehydes or other organic groups (but not epoxy or hydroxyl groups) will be formed.

Excessive epoxy functionality on the epoxy functional polymer employed in the preparation of the sulfonic acid ester can also have a beneficial effect on maintaining the shelf stability of coating compositions containing the sulfonic acid ester. As discussed hereinbefore, in those compositions wherein acid catalysts are employed, there is often a problem with premature crosslinking. The invention described herein is intended to obviate problems associated with premature crosslinking by employing a latent catalyst such that the catalyst is not generated until the composition is being cured. In fact, not even the hydroxyl functional film-forming material is generated until the composition is being cured. Although this composition essentially obviates the above noted problems with premature crosslinking, there may under certain storage and handling conditions result a premature decomposition of the latent reactive catalyst to form a sulfonic acid catalyst, which in turn would be free to catalyze a reaction between hydroxyl functionality on the polymeric component and the amino crosslinking agent. If, however, epoxy functionality is present in the composition such as from an excess of epoxy on the original epoxy functional copolymer, the generated acid will react with the epoxy and thus will not prematurely catalyze the crosslinking reaction.

The sulfonic acid catalyst generated from the sulfonic acid ester as the compositions of the invention are heated pursuant to curing them, thus not only catalyzes the hydroxyl/amino reaction, but also may react with other epoxy functionalities present on the polymeric residue formed during decomposition of the ester. As noted above, this hydroxyl functionality is then available to participate in the catalyzed hydroxyl/amino crossliniing agent.

Amine Aldehyde Crosslinking Agent

Amine-aldehyde crosslinking agents suitable for crosslinking hydroxyl bearing materials in accordance with the invention are well known in the art and their selection will be obvious to those skilled in the art.

These crosslinking agents, in general, comprise the condensation product of an amino compound with an aldehyde or aldehyde precurser. Exemplary of these types of materials are a urea-formaldehyde condensate. Exemplary of other materials within the very broad class of crosslinking agents contemplated are condensation reaction products of formaldehyde with substituted melamine, benzoguanamine and substituted benzoguanamine.

Preferred members of the broad class of crosslinking agents are alkylated melamine- and urea-formaldehyde resins. Particularly preferred are methylated and melamine-formaldehyde resins such as hexamethoxymethylmelamine. These liquid crosslinking agents have substantially one hundred percent (100%) nonvolatile content as measured by the foil method at 45° C. for 45 minutes. Some particularly well known crosslinking agents are amino resins sold by American Cyanamid under the trademark "Cymel". In particular, Cymel 301, Cymel 303, and Cymel 1156, all alkylated melamine-formaldehyde resins, are useful in compositions falling within the scope of this invention.

For further discussion of amine-aldehyde crosslinking agents see U.S. Pat. Nos. 2,222,506; 2,226,518; 2,227,223; 2,227,708; 2,322,979; 2,327,984; 2,323,357; 3,326,265; 2,350,894; 2,681,897; 2,853,463; 3,082,184; 3,235,622; 3,269,994; 3,414,635; 3,865,683; 4,083,830; 4,083,892; and 4,137,389.

Of course, the amount of crosslinking agent employed in any given composition is a matter of choice depending upon the final properties desired and the nature of the other materials in the coating composition.

Other Materials

Of course, it should be recognized that compositions within the scope of this invention may include other conventional components including, but not limited to, antioxidants, U.V. absorbers, solvents, surface modifiers, wetting agents, pigments, fillers, etc.

The invention will be further understood by referring to the following detailed examples. It should be understood that the specific examples are presented by way of illustration and not by way of limitation. Unless otherwise specified, all references to "parts" are intended to mean parts by weight.

EXAMPLE 1

In a three-necked, two liter round bottom flask, equipped with a stirrer, a condenser and a dropping funnel, 750 ml of toluene is brought to reflux under nitrogen. The following mixture of monomers, containing 15 grams of 2,2-azobis-(2-methylpropionate) dissolved in 50 ml acetone, is added dropwise to the refluxing toluene:

|  | Wt. g | Wt. % |
|---|---|---|
| Butyl methacrylate | 150 | 50 |
| Glycidyl methacrylate | 3 | 1 |
| Hydroxypropyl methacrylate | 75 | 25 |
| Methyl methacrylate | 60 | 20 |
| Styrene | 12 | 4 |

The addition of initiator and monomer solution is completed in three hours. The reaction mixture is refluxed for half an hour more and than a 10 ml acetone solution of two grams of the above initiator is added dropwise and the reaction mixture is refluxed for half an hour. Parts of the solvent is distilled out to bring the solids content to 55 percent. Three (3) grams of p-toluene sulfonic acid are dissolved in 3 ml acetone and this solution is added dropwise at room temperature to the above polymer solution with continuous stirring. The reaction mixture was stirred for five hours.

Fifty (50) parts of the above reaction mixture are mixed with 13 parts of hexamethoxymethylmelamine (Cymel 301) and 12 parts of butyl acetate. The resulting formulation is applied by spraying to primed steel panels which are baked at 140° C. for 20 minutes to obtain coatings with excellent hardness, adhesion, gloss and solvent (xylene and methyl ethyl ketone) resistance.

EXAMPLE 2

A copolymer is prepared by following the procedure described in Example 1 in methyl amyl ketone at 125° C. using the following monomers:

|  | Wt. % |
|---|---|
| Butyl methacrylate | 50 |
| Ethylhexyl acrylate | 10 |
| Glycidyl methacrylate | 2 |
| Hydroxypropyl methacrylate | 25 |
| Methyl methacrylate | 10 |
| Styrene | 3 | t-butyl peroctoate (5.25% of monomers) is used as an initiator and determined solids content of the compositio nis 62% by weight. The calculated Tg of the copolymer is 25° C. and the molecular weight from Gel Permeation Chromatography is found to be $M_n=4300$ and $M_w/M_n=2.1$.

Fifty grams of this polymer solution are placed in a separate flask and a solution of 0.6 grams of p-toluene sulfonic acid in 2 ml acetone is added dropwise with continuous stirring at room temperature. This reaction mixture is stirred for three hours. Twenty parts of this polymer solution are mixed with 23 parts of titanium dioxide and the millbase is prepared by dispersing titanium dioxide with high speed Cowl's blade. Twenty-five parts of the above sulfonate solution, 14 parts of Cymel 301 and 17 parts of n-butyl acetate added to the above millbase and the resulting formulation is applied to primed steel panels by spraying. The panels are baked at 140° C. for 20 minutes to obtain coatings with excellent hardness, adhesion and solvent (xylene and methyl ethyl ketone) resistance.

EXAMPLE 3

Five (5) parts of aluminum flakes (65% in naphtha) are added to the formulation described in Example 1 and the resulting formulation is applied to primed steel panels in three coats. The panels are baked at 135° C. for 20 minutes to obtain silver metallic coatings with excellent hareness, adhesion and solvent resistance.

EXAMPLE 4

Fifteen (15) parts of Cymel 1156 are employed as crosslinking agent in the formulation described in Example 1, instead of Cymel 301 used therein. The resulting formulation is applied to primed steel panels by spraying which are baked at 135° C. fir 20 minutes to obtain coatings with excellent hardness, adhesion and solvent (xylene and methyl ethyl ketone) resistance.

EXAMPLE 5

In the formulation described in Example 1, 12 parts of benzoguanamine resin (Cymel 1123) are used as crosslinking agent instead of Cymel 301 used therein. The resulting formulation is applied by spraying to primed steel panels which are baked at 140° C. for 20 minutes to obtain coatings with excellent hardness, adhesion and solvent (xylene and methyl ethyl ketone) resistance.

EXAMPLE 6

Ten (10) parts of polymer-sulfonate solution from Example 2 and 4 parts of glycouril resin (Cymel 1170) are dissolved in six parts of n-butyl acetate and the resulting formulation is drawn on primed steel test panels. The panels are baked at 137° C. fir 20 minutes to obtain coatings with excellent hardness, adhesion and solvent resistance.

EXAMPLE 7

Eight (8) parts of hydroxy-sulfonate solution from Example 2 and 4 parts of urea resin (Beetle 80) are dissolved in 3 parts of n-butyl acetate and the resulting formulation is drawn on primed steel panels. The panels ar baked at 140° C. for 20 minutes to obtain coatings with excellent hardness adhesion and solvent resistance.

EXAMPLE 8

By following the procedure described in Example 1 a copolymer is prepared in refluxing methyl amyl ketone from the following monomers:

|  | Wt. % |
|---|---|
| Glycidyl methacrylate | 2 |
| Hydroxyethyl acrylate | 28 |
| Butyl methacrylate | 60 |
| Styrene | 10 |

Two percent (2% t-butyl peroctoate is used as an initiator. The solids content is found to be 54 percent. From Gel Permeation Chromatography the molecular weight of the polymer is found to be: $M_n=3150$ and $M_w/M_n=2.1$.

Fifty (50) grams of this polymer solution are placed in flask and a solution of 0.4 grams of phenyl phosphonic acid in 3 ml acetone is added to it and the reaction mixture is stirred at room temperature for three hours.

Twenty parts of the above reaction mixture and six parts of Cymel 301 are dissolved in 5 parts of n-butyl acetate and the resulting formulation is drawn on primed steel panels. The panels are baked at 140° C. for 20 minutes to obtain coatings with excellent hardness, adhesion and solvent resistance.

EXAMPLE 9

Seven parts of Bakelite Cycloaliphatic Epoxide ERRA-4211 (Union Carbide) are dissolved in 10 parts of acetone and a solution of 1.8 parts of p-toluene sulfonic acid in 3 parts of acetone is added to it dropwise with continuous stirring. After the addition is complete, the reaction mixture is stirred at room temperature for two hours. Four parts of Cymel 301 and three parts of n-butyl acetate are added to the above reaction mixture. The resulting formulation is drawn on primed steel panels which are baked at 140° C. for 20 minutes to obtain coatings with excellent hardness, adhesion and solvent resistance.

EXAMPLE 10

By following the procedure described in Example 1, a copolymer is prepared from the following monomers:

|  | Wt. % |
|---|---|
| Butyl methacrylate | 40 |
| Glycidyl acrylate | 1 |
| Hydroxypropyl methacrylate | 24 |
| Methyl methacrylate | 25 |
| Styrene | 10 |

The solids content in methyl amyl ketone is determined to be 57 percent by weight.

Thirty parts of the above solution are placed in flask and 0.12 parts of methyl sulfonic acid are added to it; the reaction mixture is stirred at room temperature for two hours. Six parts of Cymel 301 and 3 parts of n-butyl acetate are added to the above reaction mixture and the resulting formulation is drawn on primed steel panels. The panels are baked at 140° C. for 20 minutes to obtain coatings with excellent hardness, adhesion and solvent resistance.

EXAMPLE 11

By following the procedure described in Example 1, a copolymer is prepared from the following monomers:

|  | Wt. % |
|---|---|
| Allyl glycidyl ether | 2 |
| Butyl methacrylate | 30 |
| Hydroxypropyl methacrylate | 28 |
| Methyl methacrylate | 25 |
| Styrene | 15 |

Toluene is distilled out to bring the solids level to 58 percent by weight.

Sixty (60) parts of the above polymer are placed in a separate flask and a solution of 1.1 parts of p-toluene sulfonic acid in 3 parts of acetone is added dropwise with continuous stirring. The reaction mixture is stirred at room temperature for two hours. Fourteen parts of Cymel 301 and 10 parts of n-butyl acetate are added to the above solution and the resulting formulation is applied by spraying to primed steel panels. The panels are baked at 135° C. for 18 minutes to obtain coatings with excellent hardness, adhesion and solvent resistance.

In view of this disclosure, many modifications of this invention will be apparent to those skilled in the art. It is intended that all such modifications which fall within the true scope of this invention be included within the terms of the appended claims.

I claim:

1. A composition of which, exclusive of pigments, solvents and other nonreactive components, consists essentially of:
   (A) a sulfonic acid ester comprising the reaction product of
      (i) a bifunctional copolymer bearing pendent epoxy functionality and at least 2 hydroxyl groups per molecule, and having a number average molecular weight ($M_n$) of between about 1,500 and about 10,000 and a glass transition temperature ($T_g$) of between about $-25°$ C. and about 70° C., said copolymer being prepared from (a) between about 0.5 and about 5 weight percent of monethylenically unsaturated monomers bearing glycidyl functionality, (b) between about 10 and about 30 weight percent of monoethylenically unsaturated monomers bearing hydroxyl functionality, and (c) between about 65 and about 89.5 weight percent of other monoethylenically unsaturated monomers, and
      (ii) a sulfonic acid having the formula

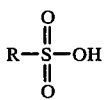

wherein R is selected from linear or branched alkyl groups and aryl groups, said epoxy functional polymer and said sulfonic acid being reacted in such amounts that there are between about 0.3 and about 1 acid groups per epoxy in the reaction mixture; and
   (B) an amine-aldehyde crosslinking agent in an amount ranging from about 15 to about 45 weight percent based on the total weight of (A) and (B).

2. A composition in accordance with claim 1 wherein said monoethylenically unsaturated monomers bearing glycidyl functionality and used in preparing said bifunctional copolymer employed in the preparation of said sulfonic acid ester are selected from glycidyl esters and glycidyl ethers.

3. A composition in accordance with claim 2 wherein said monoethylenically unsaturated monomers bearing glycidyl functionality are selected from glycidyl esters of monoethylenically unsaturated carboxylic acids.

4. A composition in accordance with claim 3 wherein said glycidyl esters are esters of acrylic or methacrylic acids.

5. A composition in accordance with claim 2 wherein said monoethylenically unsaturated monomers bearing hydroxyl functionality and used in preparing said bifunctional copolymer employed in the preparation of said sulfonic acid ester are selected from the group consisting of hydroxyalkyl acrylates formed by the reaction of $C_2$-$C_5$ dihydric alcohols and acrylic or methacrylic acids.

6. A composition in accordance with claim 2 wherein said other monoethylenically unsaturated monomers used in preparing said bifunctional copolymer employed in the preparation of said sulfonic acid ester are selected from the group consisting of acrylate monomers and other monoethylenically unsaturated vinyl monomers.

7. A composition in accordance with claim 6 wherein said acrylate monomers used in preparing said bifunctional copolymer employed in preparation of said latent reactive catalyst comprise at least about 50 weight percent of the total monomers in said copolymer.

8. A composition in accordance with claim 1, wherein said epoxy functional polymer and said sulfonic acid employed in the preparation of said sulfonic acid ester are reacted in such amounts that there are between about 0.6 and about 0.9 acid groups per epoxy in the reaction mixture.

9. A composition in accordance with claim 1, wherein the R group of said sulfonic acid employed in the preparation of said sulfonic acid ester is an ortho or paratolyl group.

10. A composition in accordance with claim 1, wherein said amine-aldehyde crosslinking agent is selected from the group consisting of condensation products of formaldehyde with melamine, substituted melamine, urea, benzoguanamine, and substituted benzoguanamine, and mixtures of said condensation products between about 15 and about 45 weight percent based on the total weight of (A), (B), (C) and (D).

* * * * *